United States Patent
Omura et al.

(10) Patent No.: US 10,333,132 B2
(45) Date of Patent: Jun. 25, 2019

(54) POWER SOURCE DEVICE INCLUDING TERMINAL FIXING PART AND DEFORMABLE BUFFER PORTION

(71) Applicant: SANYO Electric Co., Ltd., Osaka (JP)

(72) Inventors: Tetsuji Omura, Hyogo (JP); Shinichi Mitsubori, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 24 days.

(21) Appl. No.: 15/536,655

(22) PCT Filed: Oct. 2, 2015

(86) PCT No.: PCT/JP2015/005035
§ 371 (c)(1),
(2) Date: Jun. 16, 2017

(87) PCT Pub. No.: WO2016/151646
PCT Pub. Date: Sep. 29, 2016

(65) Prior Publication Data
US 2018/0145305 A1    May 24, 2018

(30) Foreign Application Priority Data
Mar. 23, 2015 (JP) .................... 2015-059084

(51) Int. Cl.
*H01M 2/30* (2006.01)
*H01M 2/20* (2006.01)

(52) U.S. Cl.
CPC ............. *H01M 2/30* (2013.01); *H01M 2/202* (2013.01); *H01M 2/206* (2013.01)

(58) Field of Classification Search
CPC ...... H01M 2/30; H01M 2/202; H01M 2/1077; H01M 2/06; H01M 10/425; H01M 2/20; H01M 2/26
See application file for complete search history.

(56) References Cited

U.S. PATENT DOCUMENTS

| | | | |
|---|---|---|---|
| 2010/0190049 A1* | 7/2010 | Kawase | H01M 2/1077 429/159 |
| 2010/0190050 A1* | 7/2010 | Ochi | H01M 2/1077 429/160 |

(Continued)

FOREIGN PATENT DOCUMENTS

| | | | | |
|---|---|---|---|---|
| JP | 2000-331721 | | 11/2000 | |
| WO | WO-2015019822 A1 * | | 2/2015 | H01M 2/1077 |

OTHER PUBLICATIONS

International Search Report of PCT application No. PCT/JP2015/005035 dated Dec. 22, 2015.

*Primary Examiner* — Imran Akram
(74) *Attorney, Agent, or Firm* — Wenderoth, Lind & Ponack, L.L.P.

(57) ABSTRACT

Power source device includes a battery block, a plate, terminal fixing part, and buffer portion. The battery block includes a battery cell having electrode terminals. The battery block has a terminal surface on which electrode terminals are positioned. The plate is disposed on the terminal surface. The plate includes output terminal portion provided with general terminal bus-bar connected to one of electrode terminals. Output terminal portion has wall portion standing along general terminal bus-bar. Terminal fixing part connects the output line (OL) having a connection terminal (CT) at a tip thereof to general terminal bus-bar. Terminal fixing part fixes the connection terminal (CT) and the general terminal bus-bar to each other by a screwing structure. Buffer portion is formed so as to be deformable between the connection terminal (CT) and wall portion.

6 Claims, 8 Drawing Sheets

(56) References Cited

U.S. PATENT DOCUMENTS

| | | | | |
|---|---|---|---|---|
| 2011/0104958 A1* | 5/2011 | Kwon | .................... | H01M 2/105 |
| | | | | 439/816 |
| 2012/0231640 A1* | 9/2012 | Ikeda | .................. | H01M 2/1061 |
| | | | | 439/110 |
| 2015/0140392 A1* | 5/2015 | Liu | ...................... | H01M 2/204 |
| | | | | 429/121 |
| 2015/0243955 A1* | 8/2015 | Kang | ...................... | H01M 2/30 |
| | | | | 429/179 |
| 2015/0349390 A1* | 12/2015 | Aiba | .................. | H01M 2/1077 |
| | | | | 429/90 |
| 2016/0190542 A1* | 6/2016 | Sengoku | ............. | H01M 2/1077 |
| | | | | 429/90 |
| 2016/0294023 A1* | 10/2016 | Aoki | .................... | H01M 2/202 |
| 2017/0033332 A1* | 2/2017 | Sakai | ...................... | H01M 2/10 |

* cited by examiner

POWER SOURCE DEVICE INCLUDING TERMINAL FIXING PART AND DEFORMABLE BUFFER PORTION This application is a U.S. national stage application of the PCT international application PCT/JP2015/005035 filed on Oct. 2, 2015, which claims the benefit of foreign priority of Japanese patent application No. 2015-059084 filed on Mar. 23, 2015, the contents all of which are incorporated herein by reference.

TECHNICAL FIELD

The present invention relates to a power source device including a terminal fixing structure of an output line.

BACKGROUND ART

In recent years, a hybrid car and an electric vehicle have been popularized. Such vehicles are equipped with a drive motor and a power source device for supplying electric power to the drive motor. As a power source device for driving, a lithium ion battery or a nickel hydrogen battery is generally used.

A power source device includes an output terminal portion for supplying electric power to a load, such as a drive motor. To the output terminal portion, an output line is fixed. The output line connects the load such as a drive motor to the power source device. It is preferable that the output line is configured detachably to the output terminal portion in view of maintenance of a vehicle. In general, the output line is fixed by a screwing structure using a bolt and a nut.

In a terminal fixing structure for carrying out fixing by a screwing structure, a terminal fixing structure of an electrical connection box capable of improving workability has been proposed (Patent Literature 1). The terminal fixing structure of Patent Literature 1 includes an electrical connection box having a terminal fixing part to be connected to an output terminal, and an output line having a connection metal fitting at a tip thereof. The terminal fixing part is provided with an insertion guide and a temporary locking mechanism. The insertion guide has a guide groove for introducing an inserted terminal metal fitting into a predetermined fixing position in an appropriate insertion orientation. The temporary locking mechanism is configured to temporarily lock the terminal metal fitting that has been inserted into the predetermined fixed position. The temporarily attached terminal metal fitting is fixed to the terminal fixing part by a screwing structure via a bolt and a nut.

With this configuration, in the terminal connection structure of Patent Literature 1, when the output line and the electrical connection box are connected to each other, the connection metal fitting at a tip of the output line can be temporarily attached by the temporary locking mechanism of the electrical connection box. Therefore, when the connection metal fitting is connected to the output terminal, displacement of the connection metal fitting can be restricted, and thus facilitating an operation.

CITATION LIST

Patent Literature

PTL 1: Japanese Patent Application Unexamined Publication No. 2000-331721

SUMMARY OF THE INVENTION

On the other hand, in an electrical connection box of PTL 1, when a terminal metal fitting and a terminal fixing part are fixed to each other using a bolt, the bolt may be tightened with torque larger than necessary. When the bolt is screwed with torque larger than prescribed, the bolt is rotated in a state in which an axial force is applied to the terminal metal fitting and the terminal fixing part, and rotation moment is applied to the terminal metal fitting with a frictional force generated on a seated surface. Since the terminal metal fitting is configured to be temporarily locked by a temporary locking mechanism, a load is applied to the temporary locking mechanism by the rotation moment applied to the terminal metal fitting. Therefore, the terminal connection structure of PTL 1 may have a problem that when torque control of the screwing structure cannot be sufficiently carried out, the temporary locking mechanism of the electrical connection box or a housing provided with the temporary locking mechanism may be damaged.

In particular, this problem is remarkable when the terminal fixing structure disclosed in PTL 1 is employed for a terminal fixing structure of an output terminal of a power source device for a vehicle. Maintenance of a vehicle is carried out by a general maintenance worker, and such a person does not necessarily understand the design of the vehicle or designs of power source devices. Therefore, the output line is not necessarily fixed to the terminal fixing part of the electrical connection box with a prescribed torque.

The invention of the present application has been made under such circumstances, and an object of the present invention is to provide a power source device including a connecting and fixing structure of an output line, being capable of preventing members from being damaged even when sufficient torque control cannot be carried out.

In order to solve the above-mentioned problems, a power source device of one embodiment of the present invention includes a battery block, a plate, a terminal fixing part, and a buffer portion. The battery block includes a battery cell having electrode terminals. The battery block has a terminal surface on which the electrode terminals are positioned. The plate is disposed on the terminal surface. The plate includes an output terminal portion to which a general terminal bus-bar connected to one of the electrode terminals is disposed. The output terminal portion has a wall portion standing along the general terminal bus-bar. The terminal fixing part connects an output line having a connection terminal at a tip thereof to the general terminal bus-bar. The terminal fixing part fixes the connection terminal and the general terminal bus-bar to each other by a screwing structure. The buffer portion is formed so as to be deformable, and provided between the connection terminal and the wall portion.

According to a configuration of one embodiment of the present invention, even when displacement due to rotation occurs in a connection terminal in fixation by a screwing structure, the configuration can prevent the connection terminal and a wall portion from being brought into contact with each other, thus preventing members such as a plate from being damaged. Furthermore, use of a buffer portion can suppress a load from the connection terminal to the wall portion.

DETAILED DESCRIPTION OF THE PREFERRED EMBODIMENT

Figure 1:
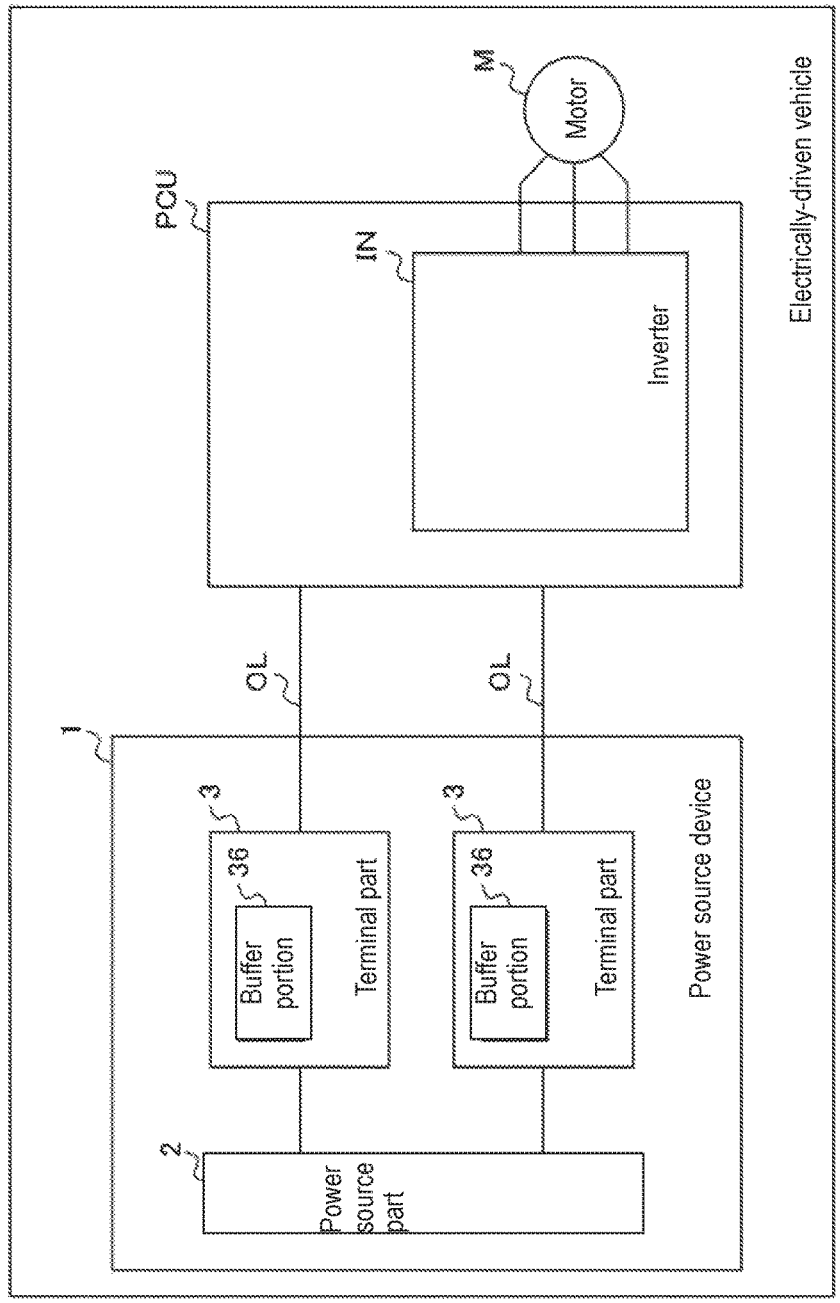
FIG. 1 is a schematic view of an electrically-driven vehicle including a power source device of the present invention.

With reference to FIG. 1, an outline of an exemplary embodiment of the present invention is described. As shown in FIG. 1, power source device 1 of one embodiment of the present invention is mounted on electrically-driven vehicles such as a hybrid car and electric vehicle. Power source device 1 includes power source part 2 including a plurality of battery cells, and terminal parts 3 for taking out outputs of power source part 2. Output lines OL are detachably connected to terminal parts 3 of power source device 1. Furthermore, each terminal part 3 is provided with buffer portion 36 so as to be able to reduce a load generated when each output line OL is detached.

An electrically-driven vehicle is equipped with motor M for driving a vehicle, and a power control unit PCU for controlling the motor M. The power control unit PCU is coupled to power source device 1 via the output line OL. The power control unit PCU includes an inverter IN. Direct current electric power of power source device 1 is input into the inverter IN via output line OL. The inverter IN converts the input direct current electric power into alternating electric power, and supplies the alternating electric power to the motor M. The motor M operates with alternating electric power supplied from the inverter IN, and drives an electrically-driven vehicle.

In power source device 1 having the above-mentioned configuration, the output line OL is detachably fixed to terminal part 3 of power source device 1. For example, at the time of replacement of power source device 1, the output line OL can be easily separated from power source device 1. Furthermore, in the above-mentioned power source device 1, a load generated when the output line OL is detached can be reduced by buffer portion 36 provided to terminal part 3. Thus, members constituting terminal part 3 and the like can be prevented from being damaged. Note here that the power source device of the present invention is not necessarily used in a power source device mounted on an electrically-driven vehicle shown in FIG. 1. The power source device of the present invention can be widely employed for various applications of the power source device.

Figure 2:
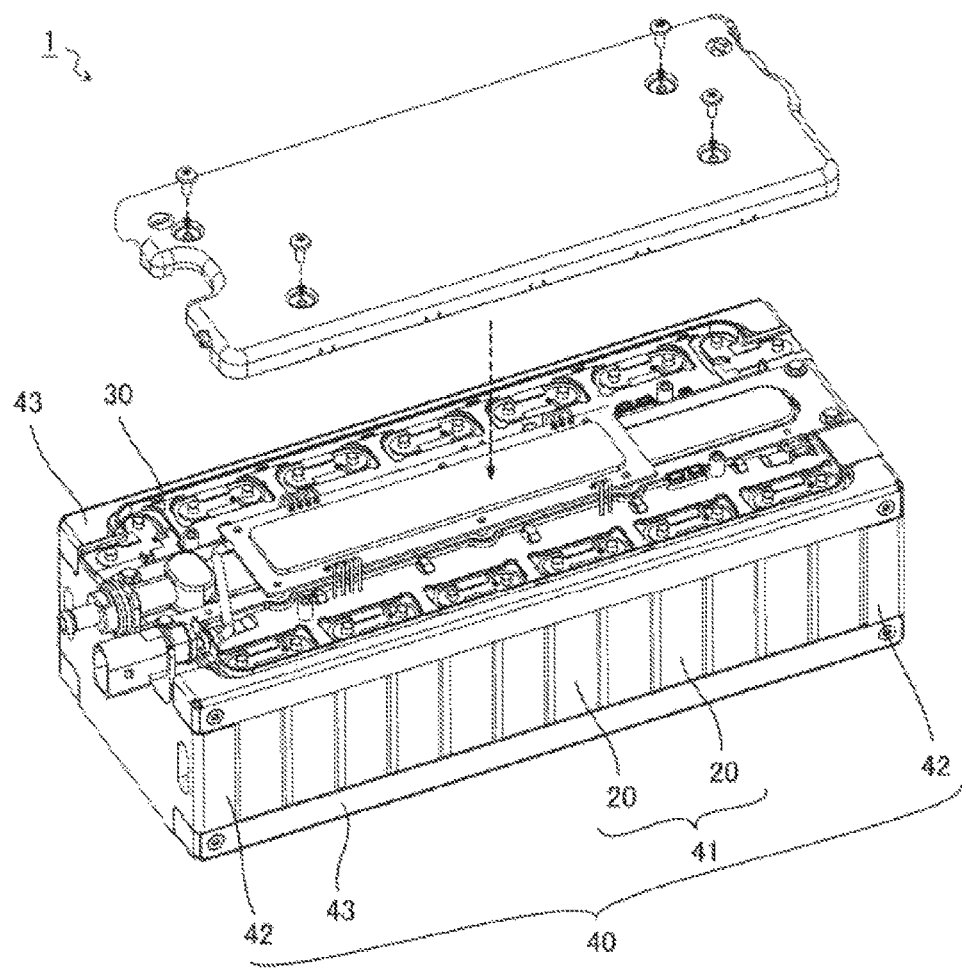
FIG. 2 is a perspective view of the power source device of one embodiment of FIG. 1.
Figure 3:
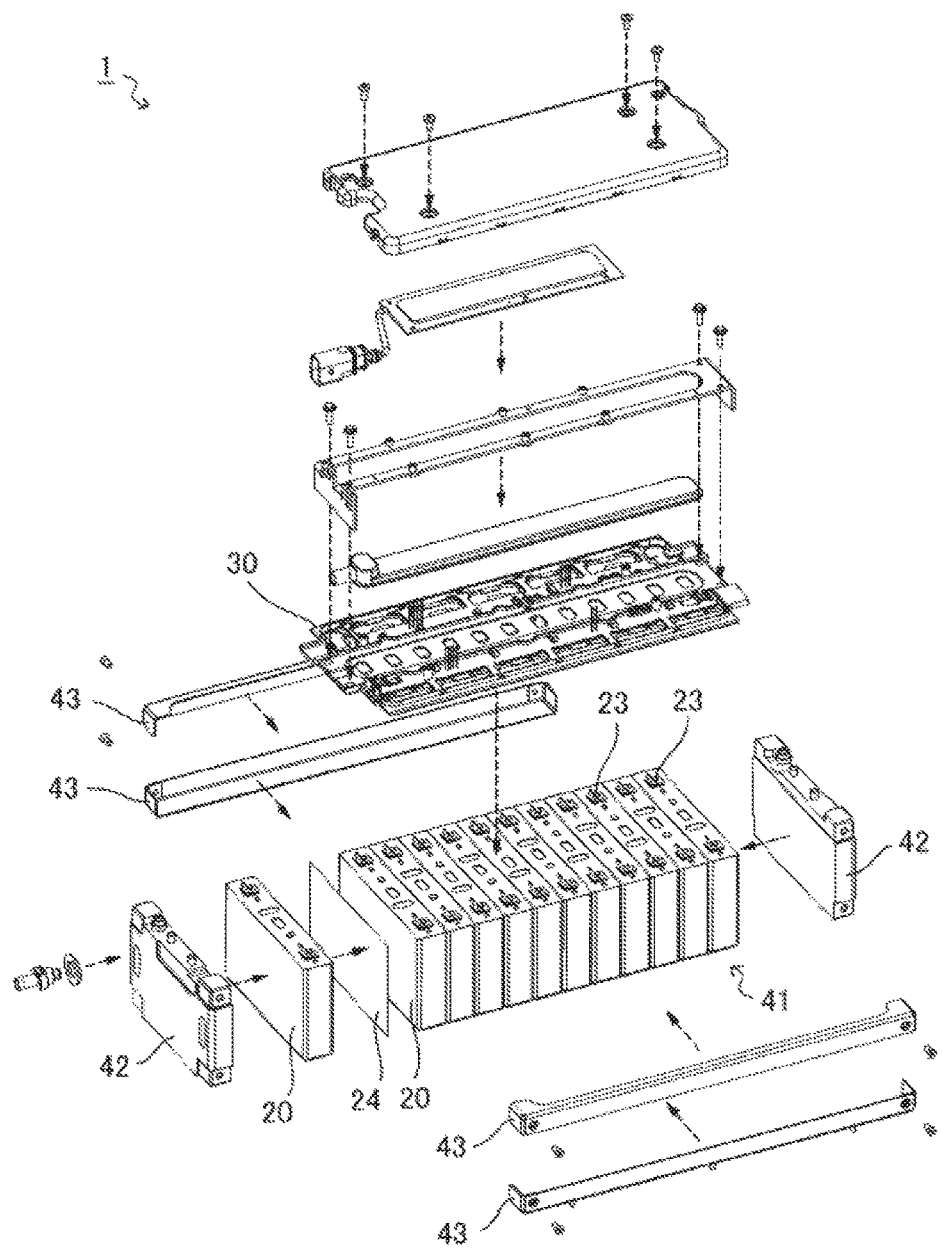
FIG. 3 is an exploded perspective view of the power source device of FIG. 2.
Figure 4:
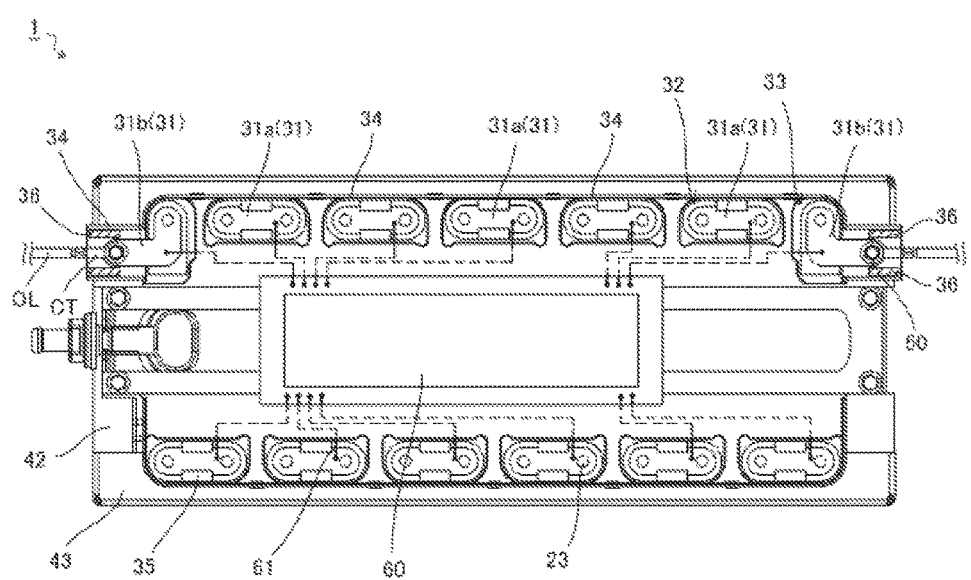
FIG. 4 is a top view of the power source device of FIG. 2.

Next, a specific configuration for embodying power source device 1 of FIG. 1 is described based on FIGS. 2 to 6. As shown in FIGS. 2 to 4, power source device 1 of one embodiment of the present invention is configured of battery block 40, and plate 30 disposed on one surface of battery block 40. Battery block 40 includes stacked body 41 containing a plurality of battery cells 20, a pair of end plates 42, and a plurality of binding bars 43. Note here that FIGS. 2 to 4 show an embodiment of a power source device including one battery block 40, but the power source device of FIGS. 2 to 4 shows only one example of a specific configuration of power source device 1 of FIG. 1. Power source device 1 of FIG. 1 may include a plurality of battery blocks 40.

Figure 6:
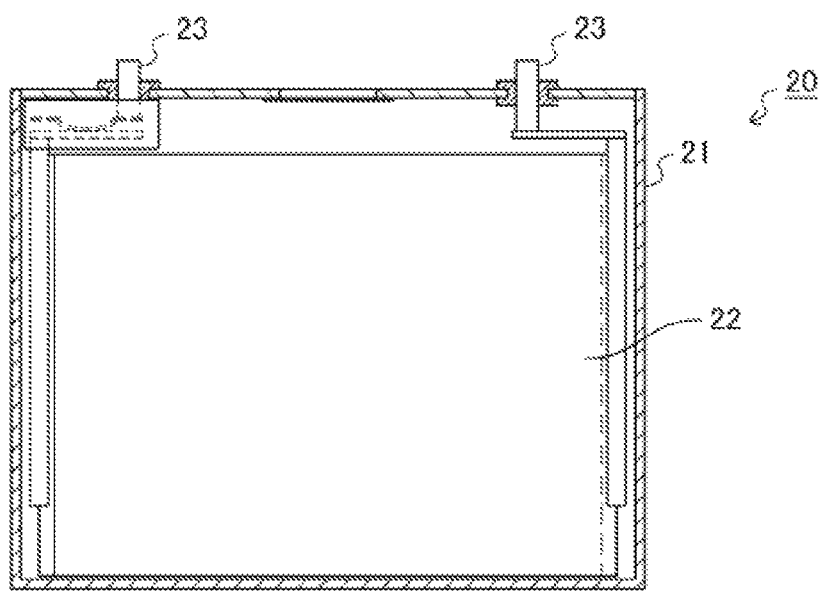
FIG. 6 is a sectional view of a battery cell in FIG. 2.

Each of the battery cells 20 shown in FIGS. 2 and 3 is a rectangular battery cell having a rectangular parallelepiped outer shape. A specific configuration is shown in FIG. 6. Battery cell 20 shown in FIG. 6 includes flat rectangular parallelepiped-shaped outer can 21, power-generating element 22 enclosed inside outer can 21, and positive and negative electrode terminals 23 provided on one surface of outer can 21. Outer can 21 has a pair of wide surfaces.

As shown in FIG. 3, stacked body 41 includes a plurality of battery cells 20 and a plurality of spacers 24 which are alternately stacked. In stacked body 41, the plurality of battery cells 20 are stacked in an orientation in which wide surfaces of adjacent battery cells 20 face each other and electrode terminals 23 of batteries cells 20 are positioned in the same plane. With this configuration, a plurality of electrode terminals 23 are arranged on one surface of stacked body 41 to form a terminal surface. Furthermore, a plurality of spacers 24 are formed of insulating resin, and disposed between the plurality of stacked battery cells 20, respectively. Spacer 24 disposed between the adjacent battery cells 20 prevent the adjacent battery cells 20 from being short-circuited.

As shown in FIGS. 2 and 3, a pair of end plates 42 are disposed at both ends of stacked body 41 in the stacking direction. A plurality of binding bars 43 as binding members are constructed on the pair of end plates 42. End plate 42 and binding bar 43 are formed of, for example, metal having high rigidity. With this configuration, binding bars 43 can restrict relative displacement of the pair of end plates 42. Note here that FIGS. 2 and 3 show, as an example, battery block 40 including a plurality of bar-shaped binding members. However, the binding member in the exemplary embodiment of the present invention is not necessarily limited to have a bar-shape.

The above-mentioned configurations can suppress dimensional change of stacked body 41. For example, in a plurality of battery cells 20 constituting stacked body 41, an internal pressure of outer can 21 is changed or power-generating element 22 enclosed in outer can 21 is swollen in response to charge and discharge. Consequently, the dimension of outer can 21 may be changed. Even in such a case, however, power source device 1 of the present invention can suppress the dimensional change of outer can 21 of battery cell 20 constituting stacked body 41 by employing a configuration in which the relative displacement of a pair of end plates 42 is restricted.

As shown in FIG. 3, plate 30 is disposed on the terminal surface of stacked body 41 constituting battery block 40. Plate 30 is formed of insulating resin. Plate 30 has through-holes corresponding to the positions of a plurality of electrode terminals 23 provided on the terminal surface. Corresponding electrode terminals 23 can be inserted though the through-holes, respectively. As shown in FIG. 4, in electrode terminals 23 protruding from the through-holes of plate 30, electrode terminals 23 of adjacent battery cells 20 are coupled to each other via bus-bar 31. Note here that bus-bar 31 is a metal conductive member, and can be formed of copper, aluminum, and the like. Furthermore, bus-bar 31 may be plated in order to prevent bus-bar 31 from corroding or to enhance the welding strength of bus-bar 31 and electrode terminal 23.

As shown in FIG. 4, a plurality of bus-bars 31 disposed to plate 30 include a plurality of connection bus-bars 31a each connecting electrode terminals 23 of adjacent battery cells 20 to each other, and a pair of general terminal bus-bars 31b forming output terminals of battery block 40. Plate 30 includes bus-bar fixing portions 32 to which connection bus-bars 31a are disposed, respectively, and output terminal portions 33 to which general terminal bus-bars 31b are disposed, respectively. Note here that output terminal portions 33 in the power source device of FIGS. 2 to 5 correspond to terminal parts 3 of FIG. 1.

Bus-bar fixing portion 32 and output terminal portion 33 have wall portion 34 standing along bus-bars 31b which are disposed to bus-bar fixing portion 32 and output terminal portion 33, respectively. This configuration enables each bus-bar 31 to be guided to a predetermined position via wall portion 34 when bus-bars 31 is disposed to bus-bar fixing portion 32 or output terminal portion 33.

Furthermore, for the purpose of improving assembly property, wall portion 34 may be provided with locking portion 35 for locking bus-bar 31 to be disposed. Locking portion 35 is a tapering claw-shaped member. Locking portion 35 is elastically deformed and bus-bar 31 is press-fitted, and thus, bus-bar 31 can be temporarily attached by locking portion 35. This configuration makes it possible to transport plate 30 in a state in which a plurality of bus-bars 31 are disposed on plate 30, and assembly workability can be improved.

Figure 5:
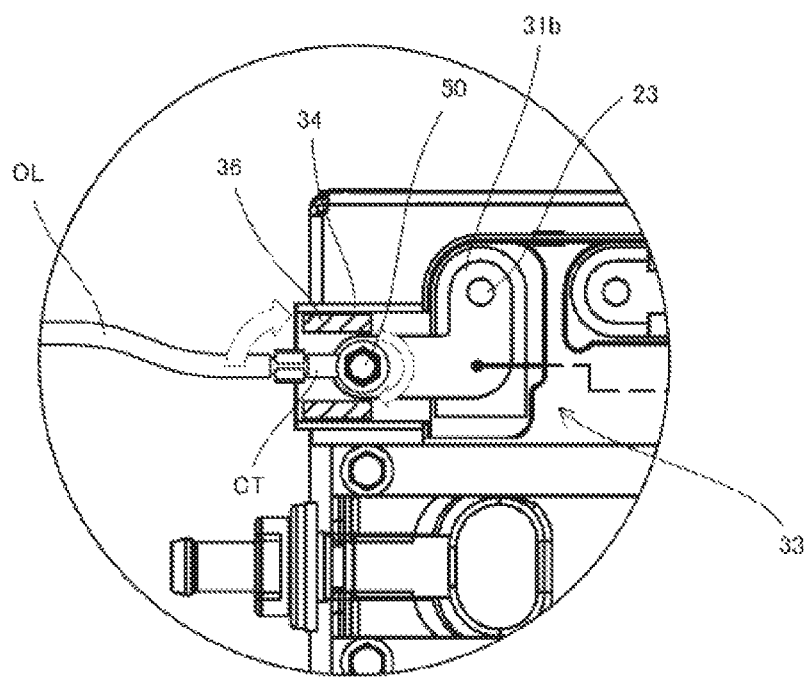
FIG. 5 is an enlarged view showing a fixing structure of an output line in the power source device of FIG. 4.

As shown in FIGS. 4 and 5, each general terminal bus-bar 31b has one end connected electrode terminal 23 of battery cell 20 and the other end provided with a through-hole for fixing output line OL. As shown in FIG. 5, the tip of the output line OL is provided with a connection terminal CT to be connected to general terminal bus-bar 31b. The connection terminal CT can be formed of, for example, a ring terminal having a through-hole. The connection terminal CT is disposed on the upper surface of general terminal bus-bar 31b in a state in which the through-hole of general terminal bus-bar 31b is positioned to the hole of the ring terminal. The connection terminal CT and general terminal bus-bar 31b are fixed to each other by terminal fixing part 50. Terminal fixing part 50 is a fixing structure using a screwing structure such as a bolt and a nut, and holds the connection terminal CT and general terminal bus-bar 31b by an axial force. The connection terminal CT and general terminal bus-bar 31b held by a sufficient axial force can be electrically connected to each other with appropriate contact resistance.

Herein, in terminal fixing part 50 using the screwing structure, relation between torque applied to the bolt and nut, and the contact resistance of the connection terminal CT and general terminal bus-bar 31b is described. As in the exemplary embodiment of the present invention, in the terminal connection structure using a screwing structure, values of the torque applied to the bolt and the nut are important. When the torque applied during tightening of the bolt and the nut is not sufficient, the bolt and the nut are loosened, the connection terminal CT and general terminal bus-bar 31b may be in a loose contact state, or the connection terminal CT may be detached from general terminal bus-bar 31b. Accordingly, in a production process of power source device 1, such connection failure can be prevented by carrying out torque control during tightening of the bolt and the nut.

However, as mentioned above, during maintenance, for the purpose of replacing power source device 1, when a maintenance worker detaches the output line OL from output terminal portion 33 of power source device 1, after the maintenance working, the maintenance worker attaches the connection terminal CT of the output line OL to general terminal bus-bar 31b of output terminal portion 33 of power source device 1. In such a case, the maintenance worker does not necessarily fix the connection terminal CT to general terminal bus-bar 31b with a prescribed torque. Consequently, the output line OL and output terminal portion 33 may be connected to each other in a state in which sufficient torque control cannot be carried out. Assuming that sufficient torque control cannot be carried out, a maintenance worker usually attempts to prevent connecting failure such as loose contact. As a result, the connection terminal CT is fixed to general terminal bus-bar 31b with a prescribed torque or more.

As mentioned above, when the bolt and nut are tightened for fixing the output line OL and bus-bar 31 to each other using a screwing structure, when the bolt and nut are seated, the axial force is applied to bus-bar 31 and the output line OL. In order to prevent connection failure, the axial force needs to be a predetermined force or more. The magnitude of torque applied when a bolt and nut are screwed has a correlation to the axial force. Accordingly, in general, controlling of the torque can indirectly control tightening of the screwing structure.

On the other hand, in fixing using the screwing structure, when torque more than necessary is applied, not only an axial force is generated but also a rotation moment occurs with a frictional force between the seated surfaces. Therefore, when the output line OL is fixed to output terminal portion 33 in a state in which the torque control cannot be sufficiently carried out, as shown by arrow in FIG. 5, the connection terminal CT of the output line OL may be rotated along the axis of the bolt of output terminal portion 33 as a center. When the connection terminal CT of the rotated output line OL is brought into contact with wall portion 34 of plate 30, a load is applied also to wall portion 34, so that plate 30 may be damaged.

Note here that whether or not the connection terminal CT of the output line OL is displaced depends on the elements related to friction, for example, material or surface roughness of the seated surface. Specifically, when a frictional force generated between the output line OL and a screwing structure such as a bolt and nut is large, the output line OL is easily rotated. When a frictional force generated between the output line OL and bus-bar 31 is large, the output line OL is not easily rotated. The frictional force is also related to an axial force generated, and it needs to be considered comprehensively.

On the other hand, since the output line and bus-bar 31 are conductive members for supplying electric power of battery cells, material to be used is also limited. In general, for example, copper and aluminum are used. Plating such as nickel plating may be carried out. Variation in the frictional force is relatively small in the range of materials to be used. The inventors of the present invention have found that when the bus-bars of, for example, copper and aluminum are used, rotation by about two to six degrees may occur depending upon the value of the torque during tightening.

Based on the above-mentioned findings, power source device 1 of one embodiment of the present invention includes buffer portion 36 along wall portion 34 of plate 30 as shown in FIG. 5. Buffer portion 36 is provided particularly on wall portion 34 of output terminal portion 33, and disposed between wall portion 34 and the connection terminal CT connected to general terminal bus-bar 31b. Buffer portion 36 is formed of a deformable material. Buffer portion 36 is an elastic member having a material thickness of 1 mm or more. Note here that buffer portion 36 is preferably a material having a small coefficient of repulsion. Specifically, buffer portion 36 can be formed of low-repulsion urethane or soft silicone.

When buffer portion 36 having a thickness of 1 mm is provided between wall portion 34 and the connection terminal CT, the connection terminal CT can be disposed in a position distant from wall portion 34 by 1 mm or more when the connection terminal CT is disposed on plate 30. Note here that in the power source device of the embodiment shown in FIG. 5, the material thickness of buffer portion 36 is 1 mm. However, the optimum value varies depending on the design dimensions of the connection terminal CT or the wall portion. This optimum material thickness can be calculated assuming the design dimensions of the connection terminal CT or the wall portion and the case where the connection terminal CT rotates by two to six degrees inclusive.

As mentioned above, when the connection terminal CT is fixed by terminal fixing part 50, in the connection terminal CT disposed on general terminal bus-bar 31b, a tip of the connection terminal CT is displaced by about 1 mm by the value of torque applied during tightening of the screwing structure. In power source device 1 having the above-mentioned configuration, the connection terminal CT can be disposed in a position distant from wall portion 34 by 1 mm or more by buffer portion 36. Therefore, even when the connection terminal CT is displaced during tightening, the connection terminal CT is not brought into contact with wall portion 34. In particular, when buffer portion 36 is formed of an elastic member having a small coefficient of repulsion, stress is expected to be relieved. Thus, it is possible to suppress application of a restoring force to the elastic member of wall portion 34. Furthermore, forming buffer portion 36 in a sponge form, stress is expected to be relieved.

Figure 7:
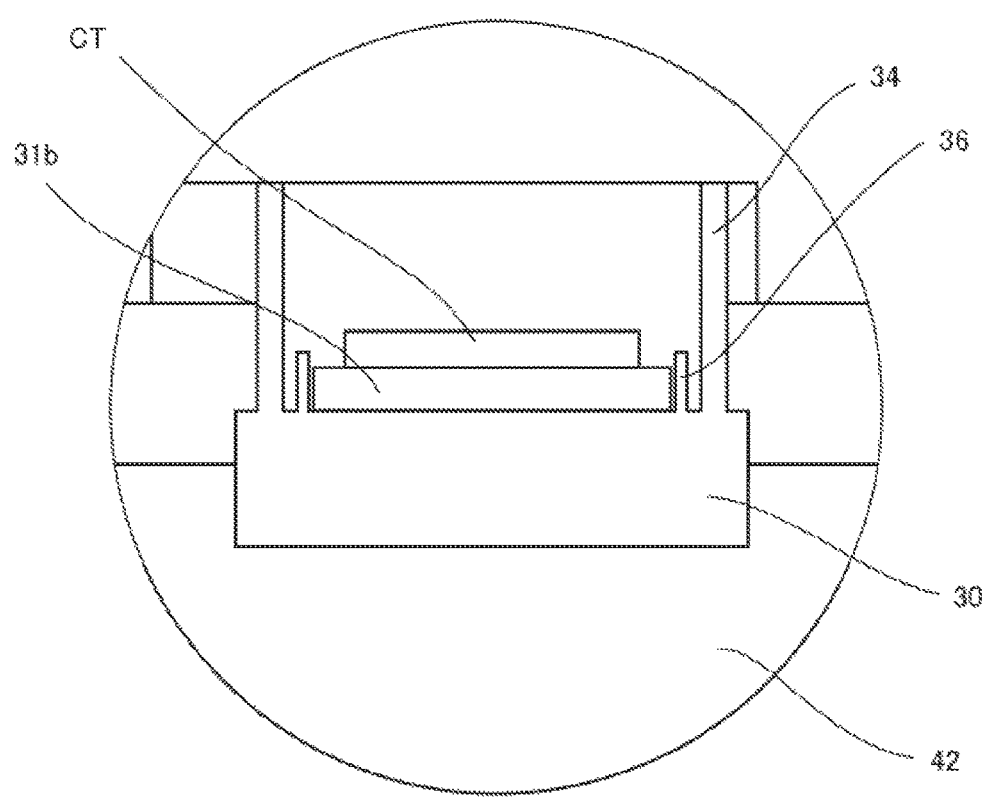
FIG. 7 is a sectional view showing a buffer portion of a modification in the power source device of the present invention.
Figure 8:
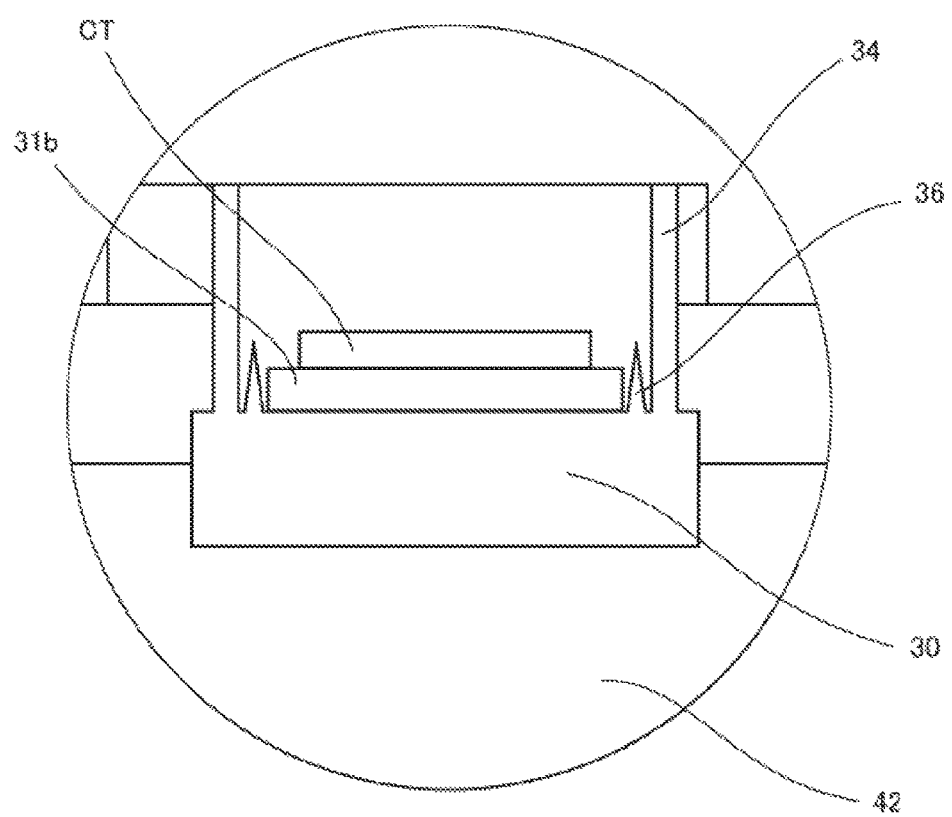
FIG. 8 is a sectional view showing a buffer portion of another modification in the power source device of the present invention.

Note here that the power source device of the above-mentioned exemplary embodiment is described as an example of a configuration in which buffer portion 36 is formed of a different member from plate 30. However, buffer portion 36 is not necessarily formed of a different member from plate 30. For example, in power source devices of modifications shown in FIGS. 7 and 8, buffer portion 36 can allow the connection terminal CT to be separated from wall portion 34 by 1 mm or more, and can suppress a load from the connection terminal CT to wall portion 34 by devising a shape of buffer portion 36. Specifically, buffer portion 36 of FIGS. 7 and 8 is a rib unitarily formed with plate 30. The rib has a thick protruding shape. When an external force in the thickness direction is applied to the rib, the rib is elastically deformed.

Furthermore, buffer portion 36 of FIG. 8 is formed in a shape having a triangular cross-section so that the tip is narrower. Buffer portion 36 of FIG. 8 can be formed such that a foot part of buffer portion 36 is larger than a portion with which the connection terminal CT is brought into contact. Buffer portion 36 of FIG. 8 can improve strength as compared with the modification of FIG. 7.

As in these cases, when buffer portion 36 is achieved only by shapes, it is not necessary to change material from that of plate 30. Thus, buffer portion 36 can be unitarily molded together with plate 30, and a manufacturing cost can be reduced.

In the power source device having the above-mentioned configuration, the connection terminal CT of the output line OL can be disposed in a position distant from wall portion 34 by a predetermined dimension or more. Consequently, even when the connection terminal CT is rotated during tightening of the bolt and the nut, wall portion 34 and the connection terminal CT are not brought into contact with each other. On the other hand, the connection terminal CT is brought into contact with buffer portion 36. However, since buffer portion 36 is formed of a deformable elastic member, buffer portion 36 is deformed to absorb a load by rotation moment. In particular, when buffer portion 36 is formed of low-repulsion elastic member, the restoring force of buffer portion 36 can be reduced, and a load transmitted to wall portion 34 can be prevented from being suppressed. Thus, it is possible to prevent wall portion 34 and plate 30 from being damaged by the load caused by the rotation moment of the connection terminal CT.

Note here that in a power source device of one embodiment of the present invention, as shown in FIG. 4, circuit board 60 is disposed on the upper surface of plate 30, so that circuit board 60 can be fixed to plate 30. A status monitoring circuit such as a voltage detection circuit is mounted on the circuit board 60, and monitors the statuses of battery cells 20 of battery block 40. Furthermore, plate 30 is provided with voltage detection line 61 for connecting bus-bars 31 and circuit board 60 to each other. Voltage detection line 61 can input information about electric potential of connected bus-bar 31 to the voltage detection circuit, and detect a voltage of battery cells 20. By disposing circuit board 60 on the upper surface of plate 30, circuit board 60 can be brought closer to battery block 40, and thus voltage detection line 61 can be shortened. With this configuration, wiring impedance can be reduced.

In the power source device having the above-mentioned configuration, circuit board 60 is fixed to plate 30. Therefore, when plate 30 is deformed or damaged, circuit board 60 may be distorted. Specifically, the status monitoring circuit mounted on circuit board 60 is often configured by a precise integrated circuit. When circuit board 60 is distorted, a load is applied to the integrated circuit, and failure may occur in the status monitoring circuit. A power source device including buffer portion 36 of the present invention can prevent the connection terminal CT of the output line OL from being brought into contact with wall portion 34 and plate 30 from being deformed or damaged. In a power source device having a configuration in which circuit board 60 is fixed to plate 30 as mentioned above, deformation of circuit board 60 caused by deformation or damage of plate 30 can be suppressed. Improvement of the reliability of the status monitoring circuit can be expected.

As mentioned above, the present invention is described with reference to the exemplary embodiments. These exemplary embodiments are only examples. A person skilled in the art would understand that combinations of components or processing processes can be variously modified, and such modifications are also encompassed in the scope of the present invention.

The invention claimed is:
1. A power source device comprising:
a battery block including at least one battery cell having electrode terminals, the battery block having a terminal surface, wherein the electrode terminals are positioned on the terminal surface;
a plate disposed on the terminal surface, and including an output terminal portion provided with a general terminal bus-bar connected to one of the electrode terminals, wherein the output terminal portion has a wall portion configured along the general terminal busbar;
an output line having a connection terminal at a tip of the output line;
a terminal fixing part for connecting the output line to the general terminal bus-bar, the terminal fixing part fixing the connection terminal and the general terminal bus-bar to each other by a screwing structure, the connec- tion terminal being configured to be rotated during tightening of the screwing structure: and a deformable buffer portion provided between the connection terminal and the wall portion, the deformable buffer portion configured to prevent the connection terminal and the wall portion from being in contact during rotation of the connection terminal.

2. The power source device according to claim 1, wherein the buffer portion includes an elastic member that is elastically deformable, and is provided in a direction in which the connection terminal approaches the wall portion.

3. The power source device according to claim 2, wherein the buffer portion is formed in a sponge form having a plurality of holes inside.

4. The power source device according to claim 2, wherein the elastic member absorbs displacement of the connection terminal so as to relieve stress.

5. The power source device according to claim 2, wherein the elastic member is formed of low-repulsion urethane or soft silicone.

6. The power source device according to claim 1, wherein the buffer portion has a predetermined thickness such that a tip of the connection terminal is prevented from being brought into contact with the wall portion when the connection terminal is rotated six degrees with respect to an axis of the screwing structure.

* * * * *